Feb. 21, 1939.                F. FARMER                   2,148,065
                              REEL SUPPORT
                         Filed Oct. 19, 1935        3 Sheets-Sheet 1

INVENTOR
Fred Farmer
BY
George G. Hastings
ATTORNEY

Feb. 21, 1939.  F. FARMER  2,148,065
REEL SUPPORT
Filed Oct. 19, 1935   3 Sheets-Sheet 2
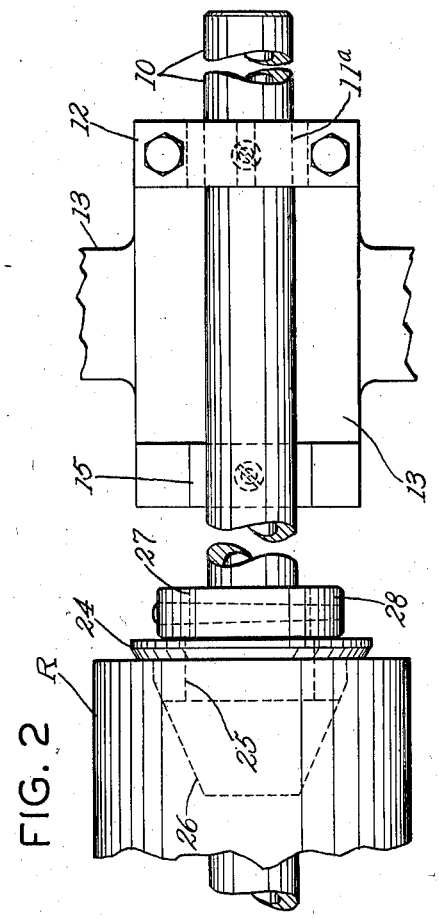
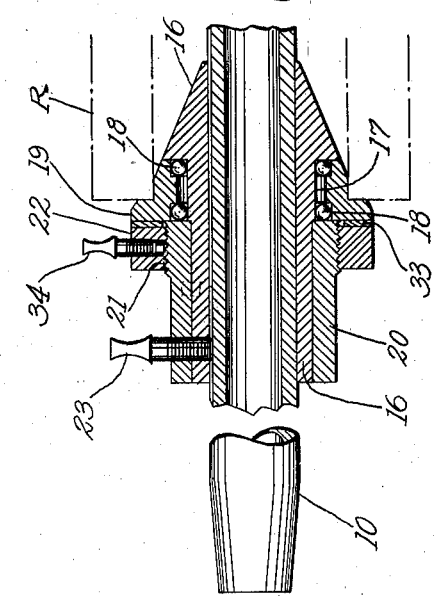
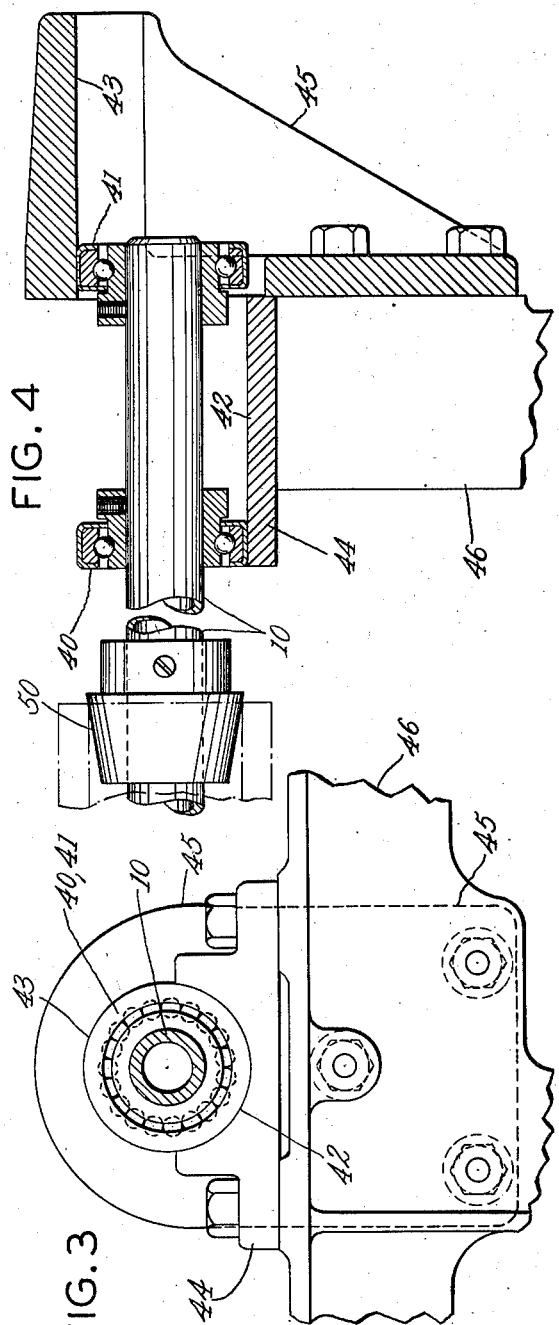
INVENTOR
Fred Farmer
BY George S. Hastings
ATTORNEY Feb. 21, 1939.   F. FARMER   2,148,065
REEL SUPPORT
Filed Oct. 19, 1935   3 Sheets-Sheet 3

INVENTOR
Fred Farmer
BY George S. Hasting
ATTORNEY

Patented Feb. 21, 1939

2,148,065

UNITED STATES PATENT OFFICE 2,148,065

REEL SUPPORT

Fred Farmer, Brooklyn, N. Y., assignor to American Machine & Foundry Company, a corporation of New Jersey Application October 19, 1935, Serial No. 45,704

11 Claims. (Cl. 242—68)

This invention relates to wrapping machines, more particularly to improvements in reel supports. In wrapping machines now in use the support for the reel of wrapping material is usually arranged in an inaccessible position, wherefore it is difficult for the attendant to change the reels. The main object of the invention, therefore, is to make it easier to exchange the reel of wrapping material in a wrapping machine. For this purpose one end of the mandrel or arbor on which the reel is mounted is left free in order that the reel may be readily slipped on or off the free end of the arbor.

A further object of the invention is to permit the position of the reel to be easily adjusted in order to center it with the articles to be wrapped, and to this end the arbor is slidably supported so that the attendant may grasp one end of the arbor and push or pull the same together with the reel into the desired position. A supplemental object is to provide self-locking means in which the arbor is slidably mounted, and with this purpose in view the arbor is supported from one end only so that it will be locked in the desired position by its own weight. Still another object of the invention is to provide an adjustable device for retarding the rotation of one of said rotatable members to the end that the tension of the wrapping material may be varied while the wrapping material is being drawn from the reel. With these and other objects not specifically mentioned in view the invention consists in certain constructions and combinations hereinafter fully described and then specifically set forth in the claims hereunto appended.

In the accompanying drawings which form a part of this specification and in which like characters of reference indicate the same or like parts:

Fig. 2 is a plan view, partly in section, taken at 2—2 of Fig. 1;

Fig. 3 is a partial side view of a modified reel support;

Fig. 4 is a sectional end view of the same; and

In carrying the invention into effect there is provided an arbor, means for slidably supporting said arbor, with one of its ends free and members mounted on said arbor and adapted to support the ends of a reel of wrapping material. In the best constructions contemplated said members may be rotatably mounted on said arbor, or they may be fastened to a rotatable arbor. The arbor, in the best constructions, may be slidably supported along its length, or it may be slidably supported from one end only in order that it may be locked in the desired position by its own weight.

The specific constructions selected to illustrate the invention may be widely varied, as they are but certain of many possible embodiments of the same. The invention, therefore, is not to be restricted to the details illustrated and described, nor to the concrete embodiments chosen as illustrative of the invention.

Figure 1:
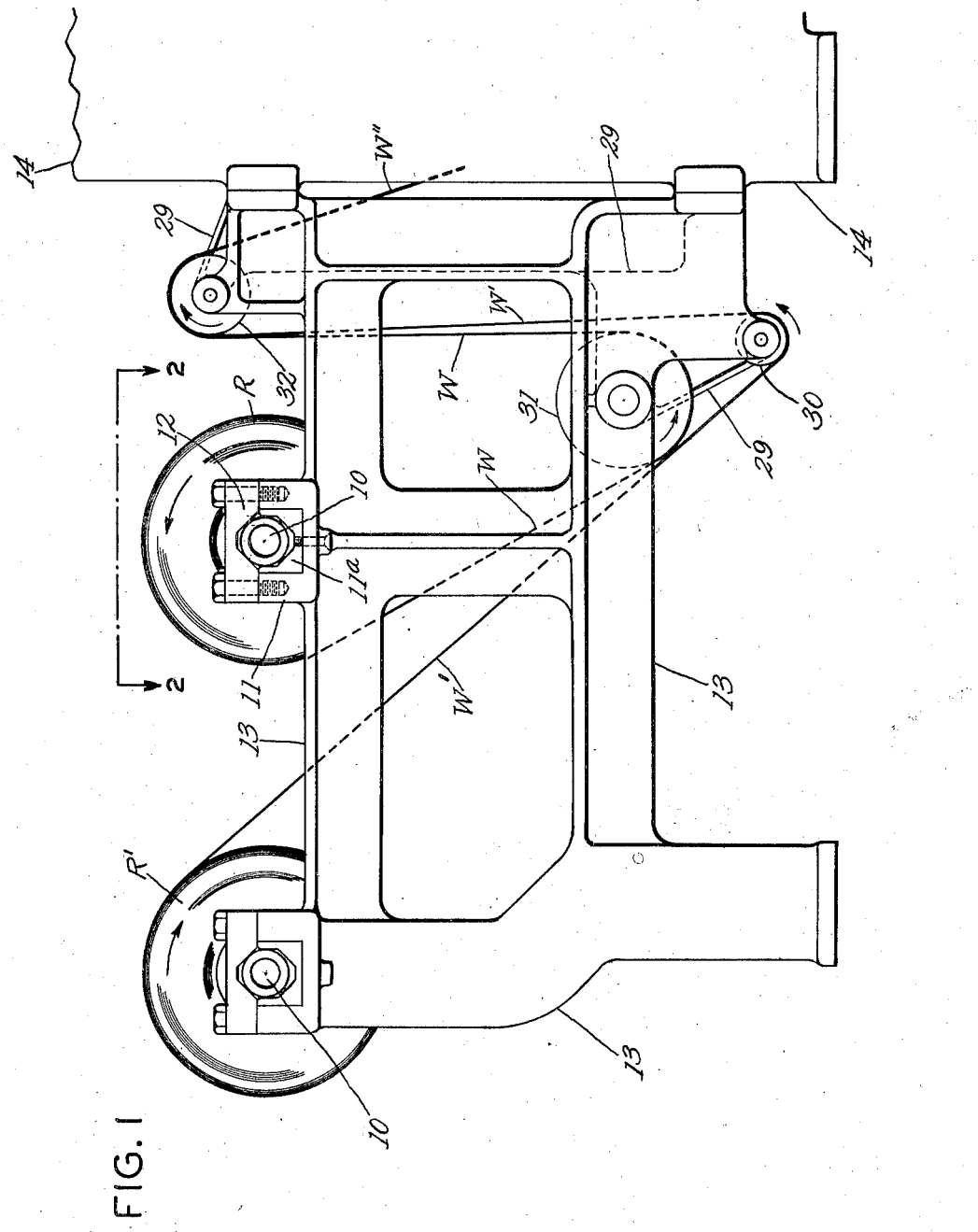
Fig. 1 is a side view of the reel support connected to the frame of a wrapping machine.

Referring to Figs. 1 and 2, wherein the invention is illustrated in connection with a double wrapping machine, the wrapping material is unwound from a reel R which may rotate freely on an arbor 10 as shown therein. One end of the arbor 10 is mounted in a pillow-block 11 provided with a cap 12 having a V-notch engaging the top of the arbor, the latter being normally clear of the bearing 11a set in the portion of the pillow-block below the cap. The pillow-block may be integral with the side frame bracket 13 which may be bolted to the front side frame 14 of the wrapping machine, and the cap may be fastened to the pillow-block by screws to retain and yet permit the arbor to slide therein. The pillow-block is also provided with a bearing 15 having a V-notch coaxial with that of the cap 12, wherefore the arbor is maintained in a horizontal position.

On the free end of the arbor 10 (Fig. 2) is mounted a sleeve 16 having a tapered end adapted to enter one end of the core of a reel of wrapping material and a shoulder 17 which supports two rows of steel balls 18 constituting ball-bearings on which the cone 19 is free to turn. A collar 20, which is threaded at 21 to receive a nut 22, is held in position on the sleeve 16 by a thumb screw 23 which also serves to removably secure the sleeve to the arbor. The cone 19 may be provided with a shoulder engaging one end of the reel core as shown in Fig. 2.

The reel R, at its other end, is mounted on a cone 24 which is of the same construction as cone 19 and is free to revolve on ball-bearings (not shown) on the shoulder 25 of the tapered sleeve 26. On another shoulder 27 of the sleeve 26 is mounted a collar 28 retaining the cone 24 against the shoulder 25, the sleeve 26 being fixed on the arbor by a pin passing through the collar, sleeve and arbor.

Although the same is not essential to the invention, the bracket 13 may be provided with an extra reel support on which is mounted a reel R'.

The reel R' is used only when it is desirable to apply a double wrapper around the articles or packages to be wrapped. This reel is supported in the same manner as reel R which has just been described, wherefore a detailed description of the same is deemed unnecessary.

However, it may be noted that the bracket 13 and a bracket 29, which is carried by the rear side frame 14 of the wrapping machine (Fig. 1), may also support cross-shafts on which are mounted the guide rollers 30, 31 and 32. Either or both reel supports may be used with wrapping machines of any type in which the wrapping material is drawn from a reel.

When used to double wrap loaves of bread with the Standard Bread Wrapping Machine, the web W' drawn off reel R' is led over guide rollers 30 and 32, and the web W drawn off reel R is led around roller 31 and over the roller 32, from which point both webs W" are led around floating rollers (not shown) and over an inclined plate and across the path of the loaf to be wrapped. The loaf is enfolded in the leading ends of the wrapping material and thus unwinds sufficient material from the reels R and R' to complete the wrapping of the loaf.

A washer 33 formed of leather or other suitable material, disposed between the cone 19 and the nut 22 (Fig. 2) retards the rotation of the reel and thus creates the desired tension in the wrapping material as it is drawn off the reel, and stops its rotation when the web is no longer pulled by the loaf. The nut 22 provides means for adjusting the friction of the washer 33 against the cone 19, so the reel will rotate freely when being unwound and stop when sufficient material has been delivered. The nut 22 when correctly set is lockefd in position by a thumb screw 34. Furthermore, the nut 22 may be adjusted to vary the tension in the wrapping material while the same is being drawn from the reel.

When a reel is to be mounted on the arbor, the thumb screw 23 is loosened and the sleeve 16 is slipped off the arbor with the cone 19. The reel is then slipped over the shaft and one end of its core is placed on the cone 24, the sleeve 16 then being replaced so that its cone 19 supports the other end of the reel and again locked to the arbor. When centering the reel, in respect to the machine, the operator grasps the arbor by its free end and lifts and slides the same until the reel is correctly positioned. In this manner the arbor is disengaged from the notch in cap 12 and bears against the bearing 11a while the attendant slides it to the desired position. When released, the arbor re-engages the notch in cap 12 and is clear of the bearing 11a, thus being locked in the horizontal position by its own weight.

In the modified form of the invention shown in Figs. 3 and 4, the arbor 10 carries adjacent one end thereof spaced ball bearings 40 and 41, the inner races of which are fastened on the arbor. The outer races of bearings 40 and 41 engage the half-round recesses 42 and 43, respectively, of the pedestal 44 and the bracket 45. The pedestal 44 and the bracket 45 are attached to a side frame bracket 46 which may be bolted to one of the side frames of the wrapping machine.

In this form the arbor rotates in said ball bearings, the inner races fastened thereon revolving on the balls which are confined by the outer races. The reel is locked between cones 50 fastened on said arbor and engaging the ends of the core of the reel, the cone adjacent the free end of arbor (not shown) being removable. The centering of the reel is performed in the same manner as in the embodiment previously described, but the arbor can be shifted only while at rest.

Figure 5:
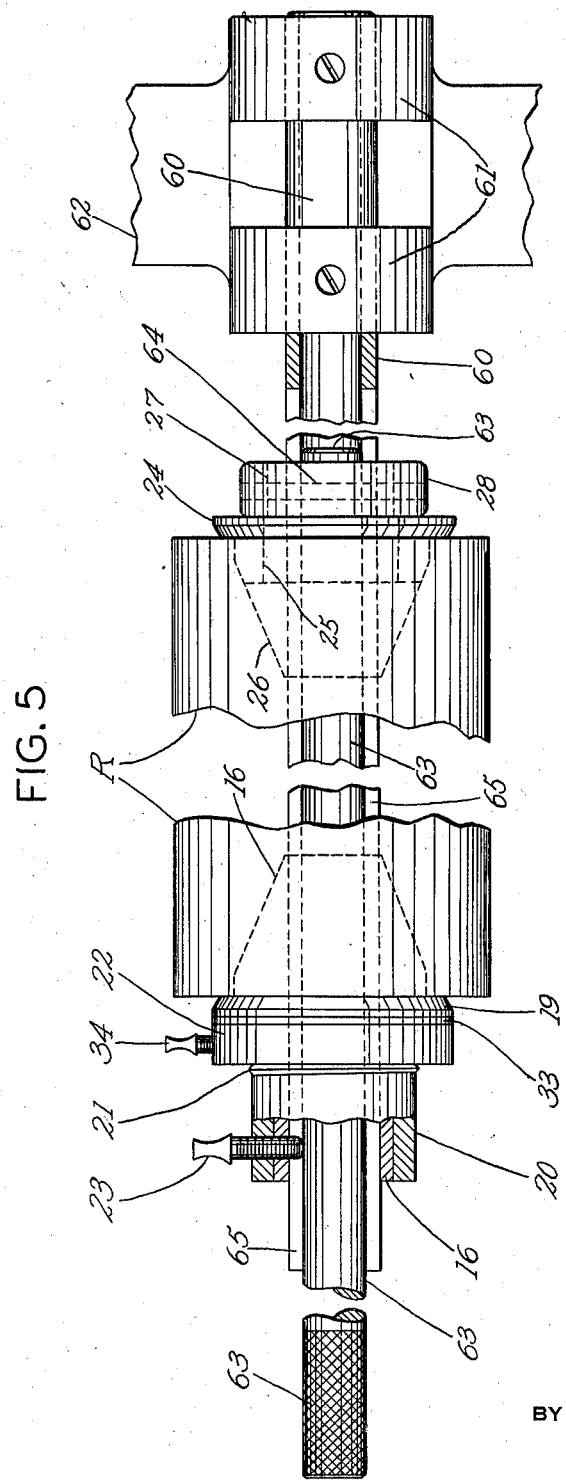
Fig. 5 is a plan view, partly in section, of another modified reel support.

In the modified form of the invention shown in Fig. 5 the sleeve 60 is fixed in the standard 61 of a side frame bracket which may be likewise bolted to one of the side frames of the wrapping machine. An arbor 63, which fits into the sleeve 60, at one end carries the cone 24 which is free to revolve on ball bearings (not shown) on the shoulder 25 of the tapered sleeve 26. On another shoulder 27 of the sleeve 26 is mounted a collar 28 retaining the cone 24 against the shoulder 25, the sleeve 26 being fixed on the arbor 63 by a pin 64 passing through the collar and arbor. The cone 24 supports one end of the reel R; and the cone 19, which supports the other end of the reel, is mounted on ball bearings (not shown) on the shoulder of a tapered sleeve 16. The construction of the latter is similar to that shown in Fig. 2, there likewise being mounted on a threaded portion of the collar 20 a nut 22 which bears against a washer 33 acting to retard the rotation of the cone 19. A thumb screw 23 passing through the collar 20 and sleeve 16 and one of the elongated slots 65 of the sleeve 60 locks the arbor against the latter, and a set screw 34 locks the nut 22 on the threaded portion 21 of the collar 20.

The pin 64 engages in the diametrically oppositely arranged elongated slots 65 provided in the sleeve 60, and the pin 64 thus holds the arbor 63 and the sleeve 26 from turning and also guides the arbor when it is moved in or out to center the reel R or bring it into an accessible position.

When a new reel is to be mounted on the arbor the thumb screw 23 is loosened and the sleeve 16 is slipped off the sleeve 60 with the cone 19. After the old reel has been drawn off over the free end of the arbor 63, the new reel is then slipped over the sleeve 60 and arbor 63 and one end of its core is placed on the cone 24, the sleeve 16 then being replaced so that its cone 19 supports the other end of the reel and the arbor 63 is again locked to the sleeve 60 by tightening the screw 23. When centering the reel R in respect to the machine, the operator grasps the knurled end of the arbor 63 and slides the same, before tightening the screw 23, until the reel is correctly positioned.

It should be noted that the various embodiments of the invention described above facilitate the operation of removing and exchanging the reels of wrapping material, especially where, as in the present Standard Bread Wrapping Machine, they underlie the side frames of the machine at a level which requires the attendant to stoop and reach under the side frames to lift the reel together with its arbor under the machine for removal thereof or placement of a new reel in position beneath the side frames. With the present invention the attendant can readily slip the reel off the free end of the arbor without having to lift it from under the machine. The attendant can then slip a new reel on the arbor and center it in the desired position.

What is claimed is:

1. In a wrapping machine, the combination with an immovable support, of an arbor on which a reel of wrapping material may be mounted, said arbor being slidably mounted in protruding relation in said support whereby a reel of wrapping material may be slipped over the protruding end of said arbor and then centered with respect to the machine by grasping said protruding end and sliding the arbor in said support, and members rotatably and slidably mounted on said support and adapted to carry the reel of wrapping material, said members being connected to said arbor in order to be shifted therewith.

2. In a wrapping machine, the combination with a support, of an arbor on which a reel of wrapping material may be mounted, said arbor being slidably mounted in protruding relation in said support whereby a reel of wrapping material may be slipped over the protruding end of said arbor and then centered with respect to the machine by grasping said protruding end and sliding the arbor in said support, said support including an immovable sleeve and said arbor being slidably mounted in said sleeve and provided on the portion thereof within said sleeve with revoluble members adapted to support said reel.

3. In a wrapping machine, the combination with an arbor on which a reel of wrapping material may be mounted, of self-locking means for slidably supporting said arbor from one end only, whereby the reel may be removed and exchanged while said arbor is supported in said means, said means including a pedestal having a bearing engaging the bottom of said arbor, and a cap normally engaging the top of said arbor, said bearing and cap being relatively offset and having coaxial recesses which engage the arbor to maintain it in horizontal position and cause it to be held in locking engagement against said cap by its own weight.

4. In a wrapping machine, the combination with a support, of an arbor slidably mounted in protruding relation in said support and adapted to permit a reel of wrapping material to be slipped over the protruding end of the arbor, a rotatable member mounted on said arbor in position to support the inner end of a reel slipped over said protruding end, a rotatable member removably mounted on said arbor in position to support the outer end of said reel, whereby the reel thus supported on the arbor may be centered with respect to the machine by grasping said protruding end and sliding the arbor in said support and means movable with said arbor for braking the rotation of said reel, said retarding means including a washer in frictional contact with the adjoining rotatable members, and a nut adjustable along the axis of said arbor to set said parts for the desired degree of friction.

5. In a wrapping machine, the combination with a support, of an arbor slidably mounted in protruding relation in said support and adapted to permit a reel of wrapping material to be slipped over the protruding end of the arbor, a member mounted in position to support the inner end of a reel slipped over said protruding end, and a member removably mounted on said arbor in position to support the outer end of said reel, whereby the reel thus supported on the arbor may be centered with respect to the machine by grasping said protruding end and sliding the arbor in said support, said support including an immovable sleeve in which said arbor is slidably mounted and said removable member being disposed on the portion of said arbor within said sleeve.

6. In a wrapping machine, the combination with a support, of an arbor slidably mounted in protruding relation in said support and adapted to permit a reel of wrapping material to be slipped over the protruding end of the arbor, a member mounted on said support and connected to said arbor in position to support the inner end of a reel slipped over said protruding end, and a member removably mounted on said support and detachably connected to said arbor in position to support the outer end of said reel, whereby the reel thus supported on the arbor may be centered with respect to the machine by grasping said protruding end and sliding the arbor in said support.

7. In a wrapping machine, the combination with an arbor, of means for slidably supporting said arbor, and members rotatably mounted on said arbor and adapted to support a reel of wrapping material, said means including an immovable sleeve in which the portion of said arbor between said members is slidably mounted.

8. In a wrapping machine, the combination with an arbor, of means for slidably supporting said arbor from one of its ends only, and members rotatably mounted on said arbor and adapted to support a reel of wrapping material, whereby the position of said reel may be adjusted while wrapping material is being drawn therefrom, by sliding said arbor in said means, said means including a pillow-block in which the arbor is slidably mounted, said pillow-block including a bearing engaging the bottom of said arbor and a cap longitudinally spaced from said bearing engaging the top of said arbor.

9. In a wrapping machine, the combination with an arbor, of means for slidably supporting said arbor from one of its ends only, and members rotatably mounted on said arbor and adapted to support a reel of wrapping material, whereby the position of said reel may be adjusted while wrapping material is being drawn therefrom, by sliding said arbor in said means, said arbor being provided with sleeves secured thereon and each having a circumferential shoulder on which one of said members is rotatably mounted, and devices for retaining said members on said shoulders.

10. In a wrapping machine, the combination with an arbor, of means for slidably supporting said arbor, members rotatably mounted on said arbor and including a cone adapted to support a reel of wrapping material, and an adjustable device carried by said arbor for retarding the rotation of said reel to permit the tension of the web of wrapping material to be varied while the wrapping material is being drawn from the reel, said adjustable device comprising a washer in frictional engagement with said cone, and a nut adapted to be screwed along the axis of said arbor to set the washer up against said cone.

11. In a wrapping machine, the combination with an arbor, of means for slidably supporting said arbor at one end only, members mounted on said arbor and adapted to support the ends of a reel of wrapping material, whereby the position of said reel may be adjusted by sliding said arbor in said means, and means movable with said arbor for retarding the rotation of the assembly including the rotatable members and the reel, said retarding means including a washer in frictional contact with the adjoining rotatable members, and a nut adjustable along the axis of said arbor to set said parts for the desired degree of friction.

FRED FARMER.